March 22, 1938. W. H. KENNEDY 2,111,859
PIPE OR HOSE COUPLING
Filed Jan. 2, 1936
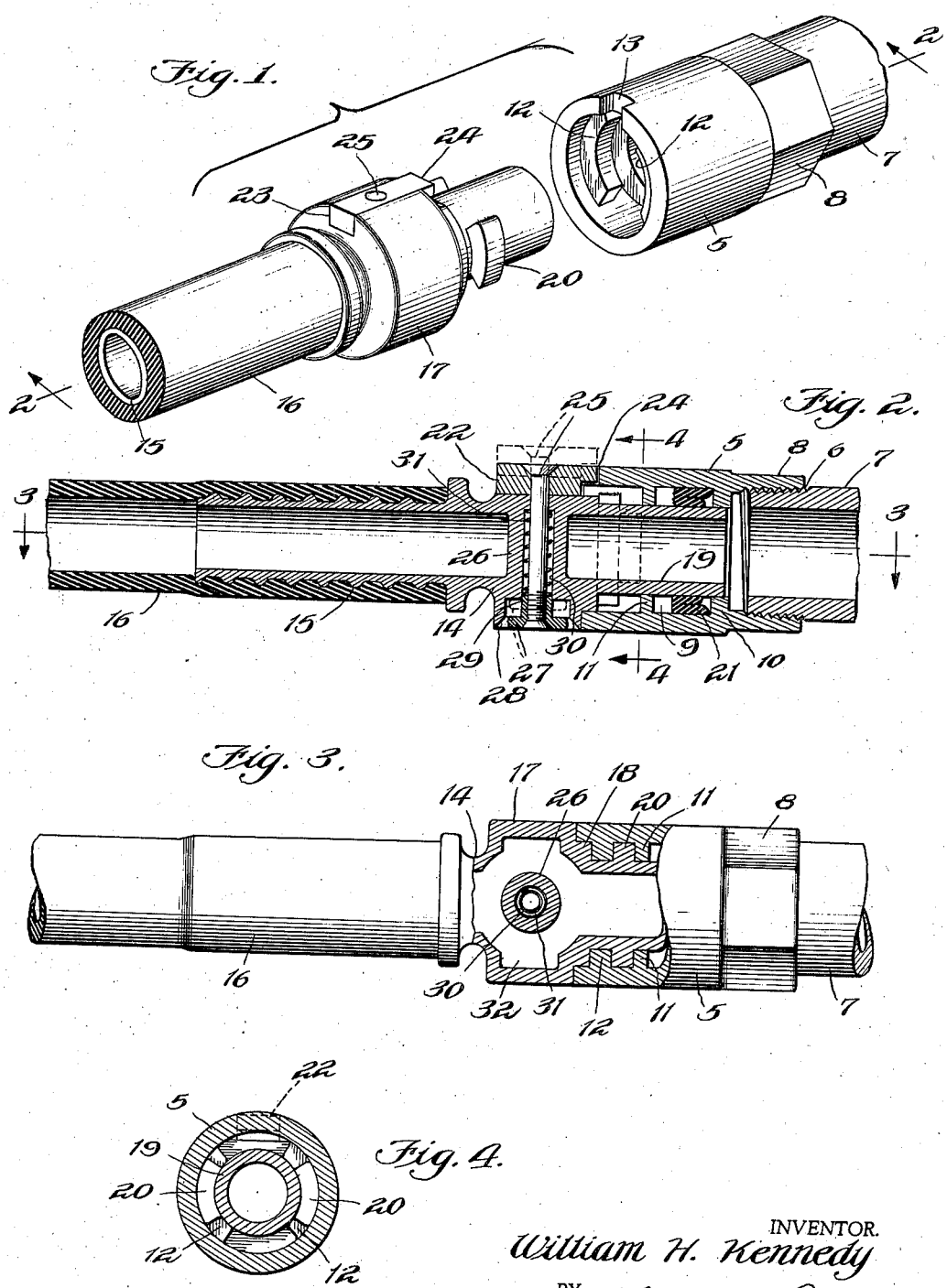
INVENTOR.
William H. Kennedy
BY Glenn S. Noble
ATTORNEY.

Patented Mar. 22, 1938

2,111,859

UNITED STATES PATENT OFFICE 2,111,859

PIPE OR HOSE COUPLING

William H. Kennedy, Chicago, Ill., assignor, by mesne assignments, to George J. Embleton, Chicago, Ill.

Application January 2, 1936, Serial No. 57,103

2 Claims. (Cl. 285—175)

This invention relates to a coupling for pipes, hose, or tubing, such as commonly used for air, gas, water, or other liquids, and is particularly useful for high pressures.

The principal object of this invention is to provide an improved coupling or connector of the character indicated which will be simple and economical in construction and particularly durable and efficient in use.

Other objects of the invention are to provide an improved coupling which may be readily connected and disconnected and which will be locked in its connected position; to provide a coupling having few parts and having substantially no projections or objectionable outer portions which are apt to catch on anything over which the hose or coupling may be drawn; to provide a coupling having novel means for making a tight closure; to provide an improved catch or lock for a detachable coupling; and to provide such other advantages and improvements as will appear from the following description.

I have illustrated a preferred form of my invention in the accompanying drawing, in which Figure 1 is a perspective view showing the coupling in separated or uncoupled position;

Figure 2 is a longitudinal sectional view taken on the line 2—2 and showing the coupling in coupled position;

Figure 3 is a side view partly in section on the line 3—3 of Figure 2; and

Figure 4 is a transverse sectional view taken on the line 4—4 of Figure 2.

The coupling shown in the drawing has a body portion or female member 5 which is provided with threads 6 at one end for engagement with the correspondingly threaded end of a pipe 7 or may be provided with any well known means for connecting the same to a hose or tubing. The outer end of the body portion or member 5 is preferably made hexagonal as shown at 8 for engagement with a wrench. This body portion also has a somewhat enlarged bore 9 with inwardly projecting annular ribs or abutments 10 and 11 which are spaced apart and positioned as shown in Figure 2. The inner or open end has two segmental fastening lugs or projections 12 and has a notch or recess 13 for receiving a lock or latch on the coacting coupling member.

This coacting or male member 14 has a shank 15 which is ridged for engagement with a hose 16, but this member may also be threaded or provided with any well known means for engagement with a pipe or tubing. The outer or body portion 17 of the coacting coupling member is of approximately the same diameter as the body portion 5 and has a shoulder portion 18 which fits closely within the open end thereof and also engages with or closely approaches the fastening lugs 12 as shown in Figure 3. The coupling member 14 has an extension or reduced end 19 which fits closely within the annular ribs or projections 10 and 11 and extends substantially through the body portion 5. This reduced extension is also provided with segmental fastening lugs or projections 20 which are spaced apart and arranged to coact with the lugs 12 for holding the coupling sections together. A tight closure is provided between the coupling members by means of a gasket or washer 21 which is preferably folded or U-shaped in cross section as shown in Figure 2, and which is positioned in the annular space between the projections 10 and 11, the arrangement being such that a tight closure is made between the inner surface or bore of the coupling member 5 and the outer surface of the projection 19.

The coupling is effected by inserting the tubular projection 19 in the body portion 5 with the fastening lugs 20 in alignment with the spaces between the fastening lugs 12 and after they have passed such lugs the male member is turned to bring the lugs 20 into engagement with the lugs 12, as shown in Figure 4.

In order to lock the parts in operative position I provide a catch or locking bolt 22 which is arranged longitudinally of the coupling and is mounted in a slot 23 in the body portion 17. This catch or bolt has an engaging portion or end 24 which is thinner than the main portion and extends beyond the body portion so as to engage with the slot or recess 13. The catch 22 is carried on the end of a bolt or pin 25 which extends through a transverse bearing or strut 26 in the body portion 17. The opposite end of the bolt is provided with a thumb-piece 27 which engages with a recess 28 in the coupling member 17 and which has a shouldered or reduced portion 29 fitting in the hollow bore 30 of the bearing 26. A spring 31 surrounds the bolt 25 and has one end engaging with the reduced portion 29 and the opposite end engaging with the abutment at the end of the bore 30, this spring tending to hold the catch 22 in locking position.

When the coupling is to be connected the male member is inserted in the manner above described and the thumb-piece 27 is pressed to raise the end 24 of the catch 22 out or beyond the outer surface of the body portion 5, so that it will not interfere with the complete engagement of the male and female members. The thumb-piece may then be released which permits the outer end 23 of the catch to rest on the outer surface of the barrel or body 5. The coupling members are then rotated relatively to each other until the fastening lugs 20 engage with the lugs 12, at which time the catch 22 is in position to engage with the slot or recess 13 and will be drawn into the recess by the spring 31, and thus lock the parts in coupled position.

When the coupling is to be uncoupled or disconnected, the thumb-piece 27 is again pressed to release the catch 22 and the coupling member is turned until the lugs 20 will pass the lugs 12, thus reversing the coupling movement. The bore of the body portion 17 of the male coupling member is preferably cored out or enlarged around the bearing 26 as shown at 32 in order to provide a passageway of the same size or greater than the main passageway therethrough as will be apparent from Figure 3.

From this description it will be seen that my improved coupling comprises a minimum number of parts and the outer configuration of the same is such that the coupling is not apt to injure the hands of persons using the same and is also not apt to catch against any object over which it may be drawn, or collect any material thereon.

While I have shown and described a practical embodiment of my invention I do not wish to be limited to the exact construction set forth except as specified in the following claims, in which I claim:

1. A coupling for pipe or hose of substantially uniform diameter, comprising a female member having inwardly projecting annular ribs and having inwardly projecting segmental festening lugs, and a male member having a shouldered portion fitting in the open end of the female member, and a reduced portion extending into the female member and engaging with said ribs, fastening lugs on said reduced portion, a transverse bearing extending through the bore of the male member, the bore being enlarged around said bearing to maintain the effective cross section of the opening through the coupling, a bolt engaging with said bearing, a catch on one end of the bolt which engages with a longitudinal slot in the outer wall of said male member and has a reduced portion which engages with a recess in the end of the female member when in locking position and is flush with the outer surface of the coupling, a thumb-piece on the opposite end of the bolt positioned in a recess in the outer surface of the male member, and a spring coacting with the bolt and tending to hold the catch in engaging position.

2. A coupling for pipe or hose comprising a female member having inwardly projecting segmental fastening lugs and a male member adapted to engage with said female member and having outwardly projecting fastening lugs which coact with the first named lugs to hold the parts against longitudinal movement, a transverse bearing extending through the bore of the male member, said bore being enlarged around the bearing whereby the passageway through the coupling is substantially uniform in cross area, a bolt engaging with said bearing, a catch on one end of the bolt which engages with a longitudinal slot in the outer wall of said male member, and has a reduced portion which engages with the recess in the end of the female member when in locking position to prevent rotative movement between said members, and is flush with the outer surface of the coupling when in locking position, a thumb-piece on the opposite end of the bolt positioned in a recess in the outer surface of the male member, and a spring coacting with the bolt and tending to hold the catch in engaging position.

WILLIAM H. KENNEDY.